(12) United States Patent
Leitermann et al.

(10) Patent No.: US 10,363,911 B2
(45) Date of Patent: Jul. 30, 2019

(54) SYSTEM AND METHOD FOR OPERATING A MOTOR VEHICLE WITH A BRAKE HOLDING ASSIST

(71) Applicant: Ford Global Technologies, LLC, Dearborn, MI (US)

(72) Inventors: Sebastian Leitermann, Erftstadt (DE); Sebastian Siegling, Cologne (DE); Olga Bergen, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/592,110

(22) Filed: May 10, 2017

(65) Prior Publication Data

US 2017/0327095 A1    Nov. 16, 2017

(30) Foreign Application Priority Data

May 11, 2016   (DE) .................. 10 2016 208 077

(51) Int. Cl.
| | |
|---|---|
| *B60T 7/04* | (2006.01) |
| *B60T 7/12* | (2006.01) |
| *B60T 8/24* | (2006.01) |
| *B60T 8/32* | (2006.01) |
| *B60T 8/171* | (2006.01) |
| *B60T 8/172* | (2006.01) |

(52) U.S. Cl.
CPC .............. *B60T 8/172* (2013.01); *B60T 7/042* (2013.01); *B60T 7/122* (2013.01); *B60T 8/171* (2013.01); *B60T 8/245* (2013.01); *B60T 8/3205* (2013.01); *B60T 2201/06* (2013.01); *B60T 2220/04* (2013.01)

(58) Field of Classification Search
CPC .......... B60T 8/171; B60T 8/172; B60T 8/245; B60T 8/3205; B60T 7/042; B60T 7/122; B60T 2201/06; B60T 2220/04
USPC .......................................................... 701/70
See application file for complete search history.

(56) References Cited

U.S. PATENT DOCUMENTS

| 5,599,075 | A | * | 2/1997 | Hara | .................. | B60K 23/0808 |
| | | | | | | 303/143 |
| 5,803,197 | A | * | 9/1998 | Hara | .................. | B60K 23/0808 |
| | | | | | | 180/248 |
| 6,039,673 | A | | 3/2000 | Mikami et al. | | |
| 6,208,929 | B1 | * | 3/2001 | Matsuno | ............ | B60K 23/0808 |
| | | | | | | 180/197 |
| 7,074,161 | B2 | | 7/2006 | Diebold et al. | | |

(Continued)

FOREIGN PATENT DOCUMENTS

DE        102009023448 A1    12/2009

*Primary Examiner* — Atul Trivedi
(74) *Attorney, Agent, or Firm* — Raymond L. Coppiellie; Burgess Law Office, PLLC

(57) ABSTRACT

Determining a brake torque reduction parameter for brake torque reduction in a motor vehicle having a brake holding assist function. The determination including detecting a motion parameter of the motor vehicle and analyzing the detected motion parameter to determine a correction value for a brake torque reduction parameter. Adjusting the brake torque reduction parameter using the correction value determines an optimized brake torque reduction parameter. The optimized brake torque reduction parameter is used as a brake torque reduction parameter of the brake torque reduction.

16 Claims, 3 Drawing Sheets

(56) References Cited

U.S. PATENT DOCUMENTS

| | | | | |
|---|---|---|---|---|
| 7,206,702 | B2* | 4/2007 | Isono | B60T 8/172 |
| | | | | 701/70 |
| 7,835,845 | B2 | 11/2010 | Lin | |
| 8,483,926 | B2* | 7/2013 | Shiozawa | B60L 3/10 |
| | | | | 303/150 |
| 2003/0125863 | A1* | 7/2003 | Tamasho | B60T 13/741 |
| | | | | 701/70 |
| 2005/0209762 | A1* | 9/2005 | Lu | B60T 7/22 |
| | | | | 701/70 |
| 2008/0183353 | A1* | 7/2008 | Post | B60G 17/0165 |
| | | | | 701/42 |
| 2010/0151988 | A1* | 6/2010 | Tabata | B60K 6/442 |
| | | | | 477/3 |
| 2011/0106388 | A1* | 5/2011 | Boeckenhoff | B60W 10/06 |
| | | | | 701/70 |
| 2015/0191160 | A1* | 7/2015 | Fairgrieve | B60K 31/02 |
| | | | | 701/93 |
| 2015/0217766 | A1* | 8/2015 | Kelly | F16H 61/0213 |
| | | | | 701/94 |
| 2015/0217767 | A1* | 8/2015 | Kelly | B60K 28/16 |
| | | | | 701/93 |
| 2015/0224970 | A1* | 8/2015 | Yasui | B60T 8/17616 |
| | | | | 701/74 |
| 2017/0232944 | A1* | 8/2017 | Owen | B60T 7/12 |
| | | | | 701/94 |
| 2017/0247023 | A1* | 8/2017 | Owen | B60T 8/1766 |

* cited by examiner

SYSTEM AND METHOD FOR OPERATING A MOTOR VEHICLE WITH A BRAKE HOLDING ASSIST

CROSS-REFERENCE TO RELATED APPLICATIONS

Not Applicable.

BACKGROUND OF THE INVENTION

1. Field of the Invention

A system and method for determining a brake torque reduction parameter for brake torque reduction in a motor vehicle with a brake holding assist feature.

2. Description of Related Art

Many modern motor vehicles include a brake holding assist feature. Examples of which include, a hill start assist, a holding assist, also known as an auto hold, an adaptive speed controller with a stop & go function, and an automatic parking assist.

For example, brake holding functions such as a hill start assist function assist the driver when starting on a hill. A hill holder, hill hold control, hill start assist or hill start aid provides assist a driver when starting on gradients by preventing a vehicle from rolling backwards. The driver of the motor vehicle need not operate the service brake system or the parking brake system because the system first operates the brake to hold the motor vehicle in place and releases the brake when the engine provides sufficient torque to move the vehicle. Assist systems make driving on gradients easier, particularly with motor vehicles having manual gearboxes. A hill start assist reducing the brake torque applied by the hill start assist too early may result in the motor vehicle rolling down a slope in a direction opposite the desired direction of travel.

A brake holding feature may also assist the driver in holding the vehicle at a standstill, in particular with automatic gearboxes. Automatic gearboxes typically provide a continuously acting propulsion torque, or creep torque, requiring the driver to operate the brake to maintain the vehicle at a standstill. Such brake holding features are typically used in stop and go driving situations, for example a traffic jam.

A further brake holding feature includes use of the electronic parking brake, that may have a function for automatic release when driving away, often called drive away release, or DAR.

Brake holding features assisting the driver in holding the vehicle at a standstill and also during automatic release of an electronic parking brake, can reduce the brake torque too late resulting in a jerky change of the longitudinal acceleration, that, for example, can be apparent as an unwanted pitching of the vehicle.

SUMMARY OF THE INVENTION

A system for determining a brake torque reduction parameter in a vehicle including a sensor detecting at least one motion parameter of the vehicle. The system further including a control unit receiving a signal from said sensor and configured to determine a correction value for an initial brake torque reduction parameter and adjusting the initial brake torque reduction parameter using the correction value to determine an optimized brake torque reduction parameter.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
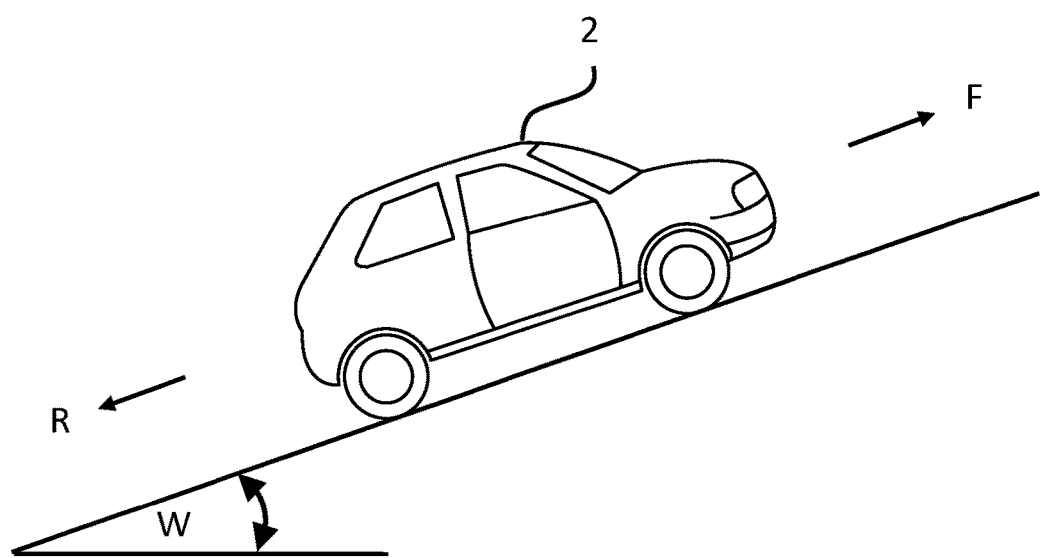
FIG. 1 is a schematic representation of a motor vehicle including a hill start assist function using a system and method, according to an exemplary embodiment, for determining a brake torque reduction parameter.

FIG. 1 illustrates a motor vehicle 2 having a hill start assist feature. In the exemplary embodiment, the motor vehicle 2 is a passenger vehicle on a highway with a highway slope W. The highway slope W forms an upslope in the forward direction F of the motor vehicle 2 and conversely a downslope in the reverse direction R of the motor vehicle 2. For this reason, a slope driving force acts on the motor vehicle 2.

The hill start assist automatically assists driving away on an upslope by preventing the motor vehicle 2 from rolling backwards in the reverse direction R. When driving away, the driver of the motor vehicle 2 need not operate the service brake system or parking brake system. When driving the motor vehicle 2 away, the hill start assist first operates the brake and releases it only when the engine is providing sufficient torque thereby making driving away on gradients easier, particularly for motor vehicles with manual gearboxes, by preventing the motor vehicle from rolling backwards. As the driver of the motor vehicle operates the gas pedal and accelerates, the brake is released at a torque value of the engine determined in the control unit of the system.

Figure 2:
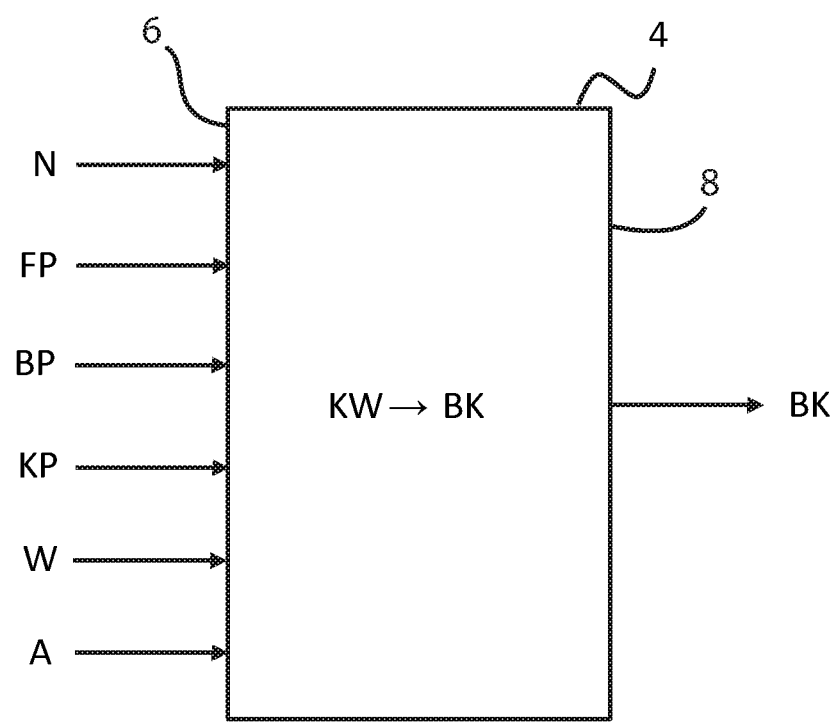
FIG. 2 is a schematic representation of an exemplary embodiment of a control unit of a system according to the invention.

FIG. 2 schematically illustrates a control unit 4 of the motor vehicle 2, in particular of a passenger vehicle. In the exemplary embodiment, the control unit 4 provides at least one brake holding function for the hill start assist. The control unit 4 may also provide further brake holding functions. For example, it may provide a brake holding function for an electronic parking brake and/or for an assist function when holding the vehicle at a standstill. The control unit may provide the functions of an anti-lock system and an ESP system. The control unit 4 may include hardware components and/or software components.

In the exemplary embodiment, the control unit 4 includes an input side 6 receiving multiple inputs, for example, sensor values providing information regarding an engaged gear N of a manual gearbox of the motor vehicle, a gas pedal position FP, a brake pedal position BP, a clutch pedal position KP, a highway slope W, or an acceleration A of the motor vehicle in or opposite to the forward direction F of the motor vehicle 2. Further, a vehicle motion parameter desired by the driver can be derived from read or observed sensor values.

The sensor values for the engaged gear N may include particular information about engagement of the forward gears or the reverse gear and whether the operator wants forward or reverse vehicle movement. The sensor values for the gas pedal position FP, the brake pedal position BP, and the clutch pedal position KP indicate the respective pedal position. The sensor values for the highway slope W indicates whether the route in the forward direction F of the motor vehicle 2 is an upslope or a downslope. The vehicle motion parameters desired by the driver can be derived from the sensor values. In particular, vehicle acceleration desired by the driver can be determined from the sensor value for the gas pedal position FP, and in some instances, considers the sensor value for the highway slope. For example, the desired point in time of driving away can be determined from the sensor values for the brake pedal position BP and the clutch pedal position KP.

An inclination sensor on the motor vehicle 2 may provide sensor values for the highway slope W. Further, detecting acceleration values in and against the forward direction F of the motor vehicle 2 with a longitudinal acceleration sensor may also provide the highway slope W. The sensor values for the acceleration A of the motor vehicle 2 in or against the forward direction of travel F of the motor vehicle 2 can be detected with bidirectional wheel revolution rate sensors which, in addition to the revolution rate, also provide information about the direction of rotation and the direction of motion of the motor vehicle 2. In the exemplary embodiment, the output signal of the bidirectional wheel revolution rate sensor is differentiated numerically to determine the driving direction-dependent acceleration A of the motor vehicle.

As shown in FIG. 2, the control unit 4 determines a correction value KW by analysis of the driving direction-dependent acceleration A for a brake torque reduction point in time correction BK. The control unit includes an output side 8 that provides a new brake torque reduction point in time using the correction value KW and the current initial brake torque reduction point in time. The new brake torque reduction point in time correction applied in the direction of the travel-dependent acceleration a of the motor vehicle 2. Correction of the point in time of brake torque reduction is, in one exemplary embodiment, established by changing the threshold value of engine torque, which correspondingly changes the time or point in time brake torque reduction; i.e., as the threshold increases, the brakes take longer to release while the engine torque builds.

Figure 3:
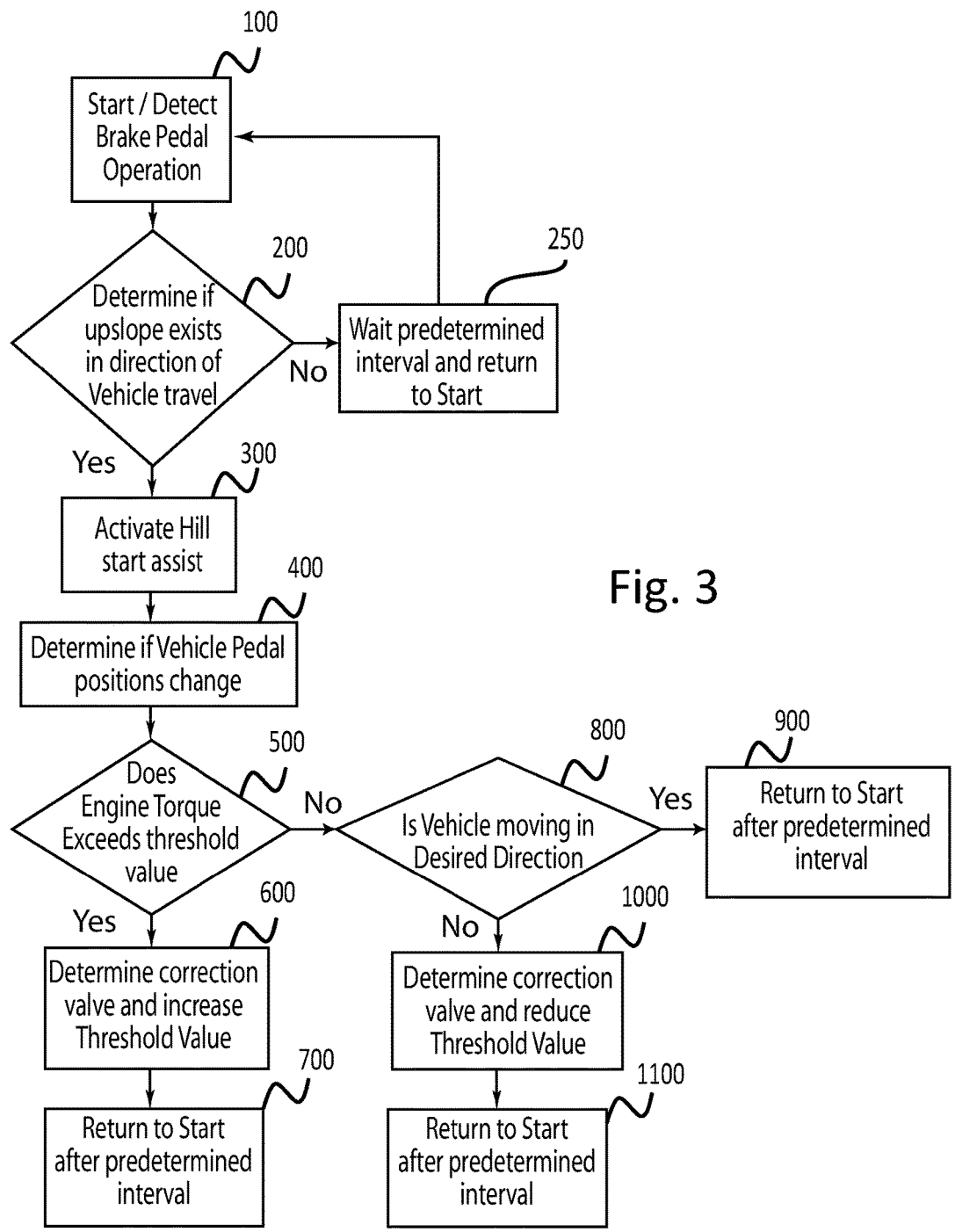
FIG. 3 is a flow chart of an exemplary embodiment of the method according to the invention.

FIG. 3 illustrates an exemplary embodiment wherein in a first step 100, the control unit 4 activates on detecting the operation of the brake pedal by analyzing sensor values for the brake pedal position BP.

Step 200 carries out a check of whether there is an upslope in the forward direction F during forward travel or an upslope in the rearward driving direction R during reverse driving. In determining if an upslope exist in the direction of vehicle travel, the sensor values for the engaged gear N are analyzed regarding engagement of one of the forward gears or the reverse gear to figure out if the motor vehicle 2 is moving forwards or backwards. Values for the highway slope W, in the exemplary embodiment motor vehicle acceleration A values in or opposite to the forward direction F of the motor vehicle 2, are detected with the longitudinal acceleration sensor. By comparing with signals from the longitudinal acceleration sensor with acceleration values for a level highway the highway slope W can be determined. Alternatively, the sensor values for the highway slope W can also be detected with an inclination sensor of the motor vehicle 2.

If the analysis in step 200 shows that the motor vehicle 2 is not on a highway with an upslope in the direction of travel, the method moves to step 250 wherein the control unit 4 waits a predetermined interval before returning to step 200 and continuing the method.

If, in step 200, the motor vehicle 2 is on a highway with an upslope in the direction of travel, i.e. for example with an engaged forward gear and an upslope of the highway in the forward direction F of the motor vehicle 2 or with reverse gear engaged and an upslope of the highway in the rearward driving direction R of the motor vehicle 2, the method advances to step 300 activating the hill start assist, or other holding feature, and closing the isolating valves of the anti-lock brake system to maintain brake torque in the system and prevent the motor vehicle from rolling backwards or in a direction opposite the direction of travel.

The method continues with step 400, wherein the system, based on analysis of the sensor values for the brake pedal position BP, determines whether driver of the motor vehicle is releasing the brake to drive away. Further, the system determines whether the sensor value for the gas pedal position FP and/or the clutch pedal position KP changes because of operation of the gas pedal and/or of the clutch pedal by the driver of the motor vehicle.

On detecting the operation of the gas pedal and/or of the clutch pedal, the method continues with step 500 wherein operation of the gas pedal and/or of the clutch pedal is monitored and a determination is made whether the engine torque is greater than a predetermined threshold value. On detecting a value greater than the threshold value, the brake torque is reduced; i.e., the brake is released.

Initially the numerically differentiated output signal of the bidirectional wheel revolution rate sensor for the direction of travel-dependent acceleration is read and compared with the previously determined direction of travel of the motor vehicle 2.

If it is determined that the motor vehicle 2 is not moving in the predetermined direction of travel the brake torque was reduced too soon, because the motor vehicle 2 is moving opposite to the direction of travel, for example since it is moving against the direction of travel on a highway with an upslope in the forward direction F. Thus, the brake torque was reduced too soon and there is a need for a correction of the point in time of the brake torque reduction. This can, for example, be the case if the motor vehicle 2 is fully loaded on a highway with severe upslopes and the engine torque is insufficient to move the motor vehicle 2 in the forward direction of travel F against the slope driving force.

Consequently, in step 600 a correction value KW is determined that defines a step size and direction for the threshold value. In step 600 the threshold value is increased by a positive correction value KW to achieve a correction of the point in time of the brake torque reduction.

The method then advances to step 700 wherein the control unit resumes the method with step 200 after a predetermined interval.

If it is determined in step 500 that the motor vehicle 2 is moving in the predetermined direction of travel, it is concluded that the brake torque was not reduced too soon. The method is then continued with step 800.

In step 800, output signals of the longitudinal acceleration sensor are read and analyzed to determine whether the motor vehicle 2 is moving in the desired direction of travel. Output signals of the bidirectional wheel revolution rate sensors could also be detected and analyzed.

If the motor vehicle 2 is moving in the desired direction, it is concluded that the brake torque was not reduced too late, i.e. that for example the threshold value is not too high. The method then advances to step 900 wherein the control unit 4 resumes the method with step 200 after a predetermined interval.

If it is determined in step 800 that the motor vehicle 2 is not moving in the predetermined direction of travel, it is concluded that the brake torque was reduced too late. The method then continues with step 1000.

In step 1000, the system determines a negative correction value KW that defines a step size and direction by which the threshold value is now reduced to achieve a correction of the point in time of the brake torque reduction.

The method then advances to step 1100 wherein the control unit 4 resumes the method with step 200 after a predetermined interval.

By repeatedly implementing the method, adaptive adjustment is achieved of operating parameters of the hill start assist function, such as, for example of a threshold value for the torque, wherein the brake is released if the threshold value is exceeded by the torque of the engine. Accordingly, the method goes through multiple iterations.

The exemplary embodiment describes using an upslope in the forward direction F of the motor vehicle 2. However, the method can also be used when driving in the reverse driving direction R on an upslope.

The detection and analysis of the driving direction-dependent acceleration enables the adjustment of the point in time of the brake torque reduction to ensure that a brake torque reduction is carried out at the correct point in time without the motor vehicle moving in a direction opposite to the direction of travel or remaining stationary owing to a reduction of the brake torque that is too late.

The exemplary embodiment describes as an example a brake holding feature such as a hill start assist. The embodiment is not limited to brake holding features like the hill start assist. In a further exemplary embodiment, the system may optimize releasing of the brake when driving away controlled by an adaptive cruise control function. The level of vehicle acceleration when driving away from a rest position with a determined gas pedal operation can be detected, for example by a longitudinal acceleration sensor. An acceleration desired by the driver can be derived from the gas pedal position and then compared with the current detected acceleration. If the detected acceleration is higher than the acceleration requested by the driver, a correction value for the brake torque reduction rate is determined. Starting from the current brake torque reduction rate, which is used as the initial brake torque reduction rate, a new brake torque reduction rate that results in driving away more gently is determined using the correction value. If the detected acceleration is lower than the acceleration requested by the driver, a correction value for the brake torque reduction rate is output that results in driving away faster. The described correction can be repeated iteratively. In yet another exemplary embodiment the method can, for example, be used to optimize the torque threshold value, which upon reaching automatically releases an electronic parking brake. For example, excessive jerking or an excessive pitching motion of the vehicle when releasing the electronic parking brake can be avoided owing to the optimization. A determined pitch angle of the vehicle can be used when releasing the brake for the optimization. Here, the pitch angle of the vehicle when driving away is determined, for example from detected acceleration values, and is compared with a threshold value for the pitch angle. The threshold value indicates a maximum pitch angle that should not be exceeded when driving away. If it emerges from the detected acceleration values that the threshold value for the pitch angle has been exceeded, this indicates a torque threshold value, which upon reaching enables release of the brake, set too high. From the amount that the threshold value for the pitch angle is exceeded, a correction value is determined for the torque threshold value, that once reached allows releasing of the brake. The correction value for the torque threshold value then indicates the amount that the torque threshold value is reduced, starting from the current torque threshold value to achieve a reduction of the pitch angle when driving away. With an optimized torque threshold value, disturbing pitching of the vehicle no longer occurs when driving away. The described procedure can be repeated iteratively until the threshold value for the pitch angle is no longer exceeded.

In the exemplary embodiment, the method for determining a brake torque reduction parameter for the brake torque reduction in a motor vehicle with a brake holding assist feature includes detecting at least one motion parameter, for example, the acceleration, the direction of motion, or a pitching motion of the motor vehicle. The detected motion parameter is analyzed and a correction value for at least one initial brake torque reduction parameter it is determined. The method adjusting the at least one initial brake torque reduction parameter using the correction value to determine at least one optimized brake torque reduction parameter and using the at least one optimized brake torque reduction parameter as the brake torque reduction parameter of the brake torque reduction. With a hydraulic brake, the brake torque is determined by a brake pressure.

The at least one brake torque reduction parameter can be a brake torque reduction point in time, a brake torque reduction rate, or a torque threshold value wherein the brake is released if the torque threshold value is exceeded by the torque of the engine. The at least one initial brake torque reduction parameter can be an initial brake torque reduction point in time, or an initial brake torque reduction rate, or an initial torque threshold value. A brake torque reduction point in time correction value, a brake torque reduction rate correction value, or a torque threshold value correction value can be the correction value. The correction value can represent a time period that the brake torque is to be reduced earlier or later, for an amount that the brake torque reduction rate is increased or reduced or for an amount that a torque threshold value is reduced or increased, wherein the brake is released if the torque threshold value is exceeded by the torque of the engine. The motion parameter can for example be an acceleration, a direction of motion, or a pitch angle.

For determining the correction value, for example a deviation of the detected motion parameter from a predetermined value or a predetermined threshold value for the motion parameter can be used. The brake torque reduction parameter is then optimized by the correction value such that the deviation of the motion parameter from the predetermined value is minimized, the predetermined threshold value is reached by or exceeded by the motion parameter, or the motion parameter reaches or falls below the predetermined threshold value, depending on whether the threshold value is a threshold value that is not to be fallen below or not to be exceeded. This enables the brake torque reduction parameter to be optimized with a hill start assist, for example, so rolling backwards on a hill against the direction of travel can be reliably prevented. When assisting the driver by holding the vehicle at a standstill and also during the automatic release of an electronic parking brake, it can be achieved with the optimized brake torque reduction parameter that the pitching motion when driving away falls below a determined threshold value not perceived as disturbing by the driver.

Alternatively, a desired motion parameter can be derived from detected vehicle parameter values. The correction value can be determined from the difference between the desired motion parameter and the detected motion parameter, wherein the optimization is carried out to minimize the deviation of the detected motion parameter from the desired motion parameter. As a desired motion parameter, for example, a desired acceleration can be derived from the position of the gas pedal. Alternatively, a desired direction of travel can be derived as a desired motion parameter from the engaged gear or the position of the gear lever of an automatic gearbox. This enables determination of a correction value over time for each of several desired motion parameters, so that over time a brake torque reduction parameter for several desired motion parameters is optimized thereby minimizing deviation of the detected motion parameter from the desired motion parameter.

The release of the brake can be optimized by the at least one brake torque reduction parameter, and in particular by the brake torque reduction parameters brake torque reduction rate and brake torque reduction point in time. The method is carried out repeatedly and the initial brake torque reduction parameter for current performance is formed from the optimized brake torque reduction parameter of the previous process. The iterative optimization of the at least one brake torque reduction parameter is possible enabling progressive optimization of the parameter. For this reason, the method adjusts or optimizes the point in time and the manner of release of the brake.

The acceleration can be a binary value for a sign or direction of the acceleration or a numerical value for the magnitude of the acceleration. By detecting and analyzing the acceleration, determining whether the direction the motor vehicle motor vehicle is traveling is opposite to the desired direction of travel is simplified in the event of too early a reduction of the brake torque. It can be determined simply whether the motor vehicle is moving in the desired direction of travel or, if the brake torque is reduced to late, remains stationary or is accelerated jerkily when the brake torque is reduced. From the detected acceleration, however, the magnitude of pitching of the vehicle can also be determined. The detection and analysis of the acceleration enables adjustment of the at least one brake torque reduction parameter, in particular the point in time of the brake torque reduction and the brake torque reduction rate, to ensure that a brake torque reduction is carried out at the correct point in time without the motor vehicle moving in a direction opposite to the direction of travel or performing a disturbing pitching motion because of the brake torque reduction being too late.

A bidirectional wheel revolution rate sensor of the motor vehicle detects the acceleration. Such bidirectional wheel revolution rate sensors provide an output variable that, besides the revolution rate, also provides information about the direction of rotation and the direction of motion of the motor vehicle. Anti-lock and ESP systems of motor vehicles comprise such bidirectional wheel revolution rate sensors, so that already provided sensors can be used.

An output signal of the bidirectional wheel revolution rate sensor is differentiated against time to determine the acceleration. For example, a numerical derivation of an acceleration value is determined and no separate acceleration sensors are necessary.

A longitudinal acceleration sensor of the motor vehicle detects the acceleration. Even without a bidirectional wheel revolution rate sensor, the direction of travel-dependent acceleration can be determined. The magnitude of a pitching motion of the vehicle when driving away can be derived from the detected longitudinal acceleration.

The correction value represents a factor based on reducing a brake torque too early or late. The correction value indicates by how much a threshold value should be reduced or increased, for example, the brake is released if the threshold value is exceeded by the torque of the engine. The correction value can further indicate the time that the time is reduced or extended while the holding action is holding the brake.

A slope of the highway is detected and considered when analyzing the at least one motion parameter. Detecting the slope of the highway, detects whether the route of the motor vehicle is an upslope or a downslope in the direction of travel. The information can, for example, be used by a hill start assist function when determining the correction value for the brake torque reduction parameter.

The present invention has been described in detail using exemplary embodiments for the purpose of explanation. Said exemplary embodiments, however, do not exhaustively represent all possible application scenarios for the invention. A person skilled in the art can find further scenarios in which a brake torque reduction parameter in a motor vehicle with a brake holding assist function can be optimized using the method according to the invention or the control unit according to the invention. The invention shall not therefore be limited to the application cases described in the exemplary embodiments, but only by the accompanying claims.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for determining a brake torque reduction parameter for brake torque reduction in a motor vehicle with a brake holding assist function comprising:
   detecting at least one motion parameter of the motor vehicle;
   comparing the at least one detected motion parameter with a predetermined threshold value of said motion parameter;
   determining a correction value for at least one initial brake torque reduction parameter when said at least one detected motion parameter differs from said predetermined threshold value of said motion parameter;
   adjusting the at least one initial brake torque reduction parameter using the correction value to determine at least one optimized brake torque reduction parameter;
   wherein the at least one brake torque reduction parameter is a point in time of a brake torque reduction, the at least one initial brake torque parameter is an initial point in time of a brake torque reduction, and the brake torque reduction point in time correction value; and
   using the at least one optimized brake torque reduction parameter as a brake torque reduction parameter for the brake torque reduction and changing the point in time of the brake torque reduction and correspondingly the point in time of a vehicle brake release.

2. The method of claim 1 including repeating the steps so the brake torque reduction parameter for the current iteration is based on the brake torque reduction parameter of the preceding iteration.

3. The method of claim 1 wherein the at least one motion parameter is an acceleration, a direction of motion, or a pitch angle.

4. The method of claim 1 wherein at least one motion parameter is a direction of motion of the vehicle; and
using a bidirectional wheel revolution rate sensor to detect the direction of motion.

5. The method of claim 4 wherein an output signal of the bidirectional wheel revolution rate sensor is differentiated against time to determine an acceleration.

6. The method of claim 1 wherein at least one motion parameter is an acceleration of the vehicle; and
using a longitudinal acceleration sensor to detect the acceleration of the motor vehicle.

7. The method of claim 1 wherein a desired motion parameter is derived from the detected vehicle parameter values;
the correction value is determined from the difference between the desired motion parameter and the detected motion parameter; and
minimizing the deviation of the detected motion parameter from the desired motion parameter.

8. The method of claim 1 including detecting and using a slope of the highway when comparing the at least one motion parameter.

9. The method of claim 1 including detecting and using an engaged gear of the motor vehicle when comparing the at least one motion parameter.

10. The method of claim 1 including detecting and using a gas pedal position or a clutch pedal position of the motor vehicle when comparing the at least one motion parameter.

11. A system for determining a brake torque reduction parameter in a vehicle comprising:
a sensor detecting at least one motion parameter of the vehicle;
a control unit receiving a signal from said sensor and configured to determine a correction value for an initial brake torque reduction parameter and adjusting the initial brake torque reduction parameter using the correction value to determine an optimized brake torque reduction parameter;
wherein the initial brake torque parameter is an initial point in time of a brake torque reduction, and the correction value for an initial brake torque reduction parameter is a brake torque reduction point in time correction value; and
wherein the optimized brake torque reduction parameter changes the point in time of the brake torque reduction and correspondingly the point in time of a vehicle brake release.

12. The system of claim 11 wherein said sensor is a bidirectional wheel revolution rate sensor.

13. The system of claim 11 wherein said sensor is a longitudinal acceleration sensor.

14. The system of claim 11 wherein said sensor generates a signal corresponding to the acceleration of the vehicle.

15. The system of claim 11 including a second sensor, said second sensor generating a signal corresponding to a position of a vehicle pedal.

16. The system of claim 11 including the control unit configured to determine the correction value from the difference between a desired motion parameter and the detected motion parameter.

* * * * *